Figure 1:
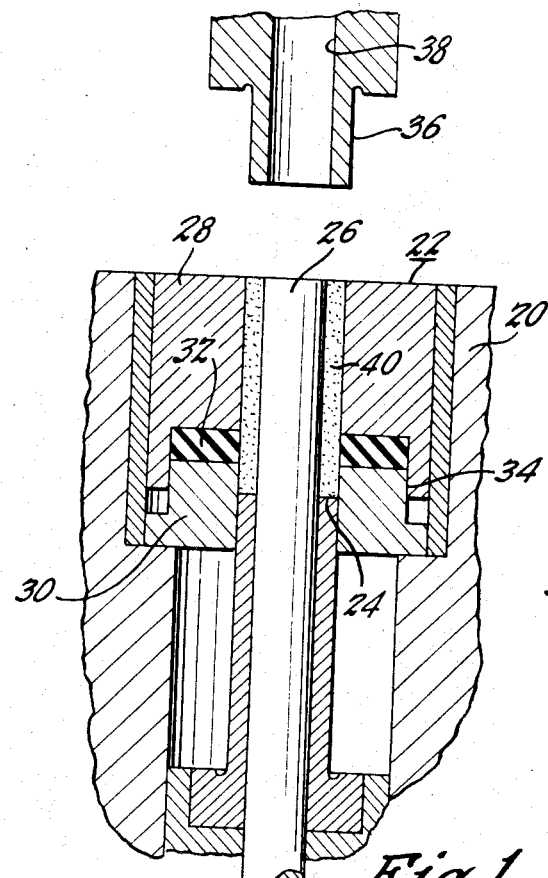

Oct. 17, 1944.  C. R. TALMAGE  2,360,528
METHOD OF MAKING POWDERED METAL ARTICLES
Filed Aug. 13, 1941  3 Sheets-Sheet 1

INVENTOR
Charles R. Talmage
BY
HIS ATTORNEYS

Patented Oct. 17, 1944

2,360,528

UNITED STATES PATENT OFFICE 2,360,528

METHOD OF MAKING POWDERED METAL ARTICLES

Charles R. Talmage, Dayton, Ohio, assignor to General Motors Corporation, Detroit, Mich., a corporation of Delaware Application August 13, 1941, Serial No. 406,687

3 Claims. (Cl. 29—149.5)

This invention relates to a method for briquetting powdered materials and is particularly concerned with a method for briquetting metal powders into bushings and the like which, include annular grooves therein.

An object of the invention is to provide a method for briquetting a bushing or the like which includes an annular groove therein and which may be axially removed from the die after the briquetting operation is completed.

A further object is to provide a method for briquetting powdered metal in an axial direction and simultaneously applying a radial pressure thereto for forming an annular groove therein.

Further objects and advantages of the present invention will be apparent from the following description, reference being had to the accompanying drawings wherein preferred embodiments of the present invention are clearly shown.

Figs. 1 to 4 inclusive are fragmentary sectional views of apparatus used for briquetting metal powder into a bushing which includes an annular groove on the outer surface thereof.

Figs. 5 through 8 inclusive are fragmentary sectional views of an apparatus for briquetting metal powder into a bushing having an annular groove at the inner surface thereof and Figs. 9 through 12 inclusive are fragmentary sectional views of an apparatus used in making a bushing having annular grooves at the inner and outer surfaces thereof.

In the briquetting of powdered material such as powdered metal and the like, conventional briquetting machines have been utilized wherein pressure is applied to the charge of powdered material in the die barrel in an endwise direction, that is, axially of the barrel. Powdered material is compressed under suitable high pressures to cause the material to attain a self-sustaining shape which may be ejected from the die barrel in the formed condition. This type of briquetting has limited the shape of articles which may be manufactured since it is apparent that if the die barrel has any inwardly extending portion for forming indentations or grooves in the article that the article would be incapable of ejection without considerable complicated mechanism to remove the indenting portion and present a smooth dies wall prior to ejection. Similarly it has been impossible to form internal indentations or radial grooves on the inner surfaces of annular objects formed in conventional briquetting machinery such as bushings.

The present invention is particularly directed to an apparatus and method whereby annular grooves or indentations may be formed in bushings and the like either at the internal or external surfaces thereof. In order to accomplish this end, I have provided an apparatus wherein the plunger, die barrel or both plunger and die barrel include a soft rubber insert therein which when no pressure is applied to the die barrel or plunger has substantially the same diameter as the remainder of the member but when pressure is applied, the rubber portion is compressed and expands thereby changing the rubber portion to a diameter different than its supporting member. In this manner, the rubber portion can form indentations or annular grooves in the powdered material during the briquetting thereof and when pressure is relieved the rubber portion resumes its normal shape and the article may easily be ejected from the die.

Figure 2:
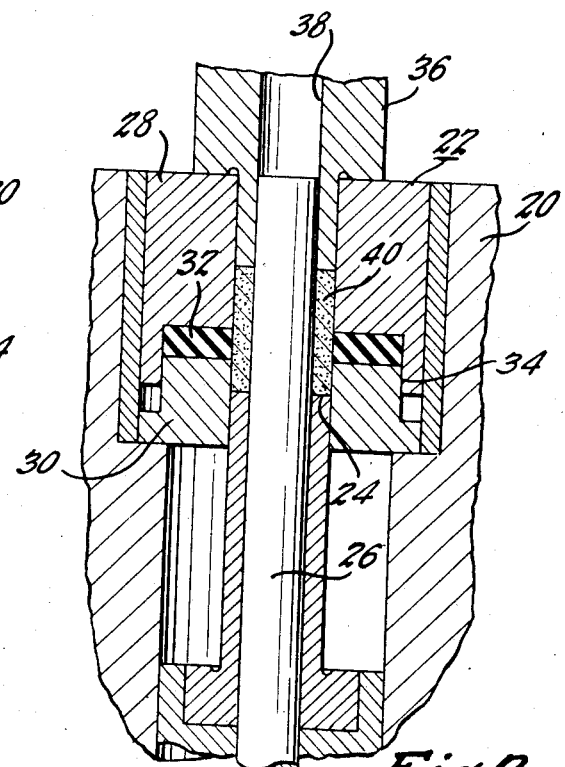
Figure 3:
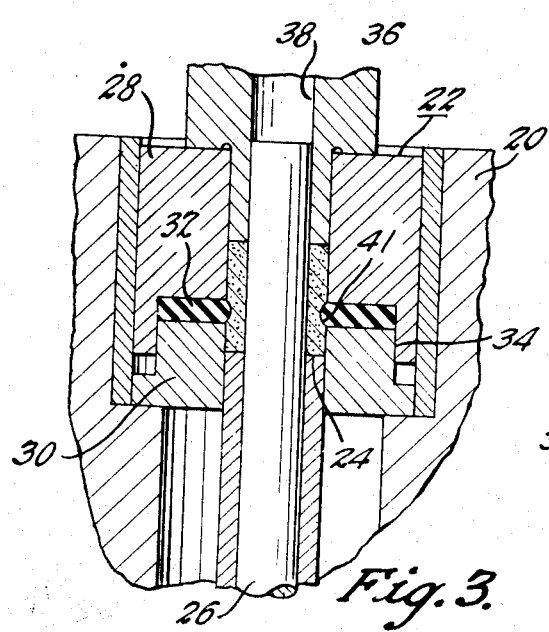
Figure 4:
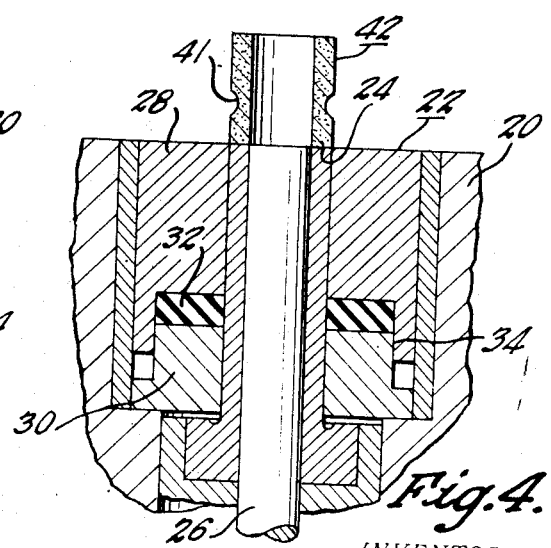
Figure 5:
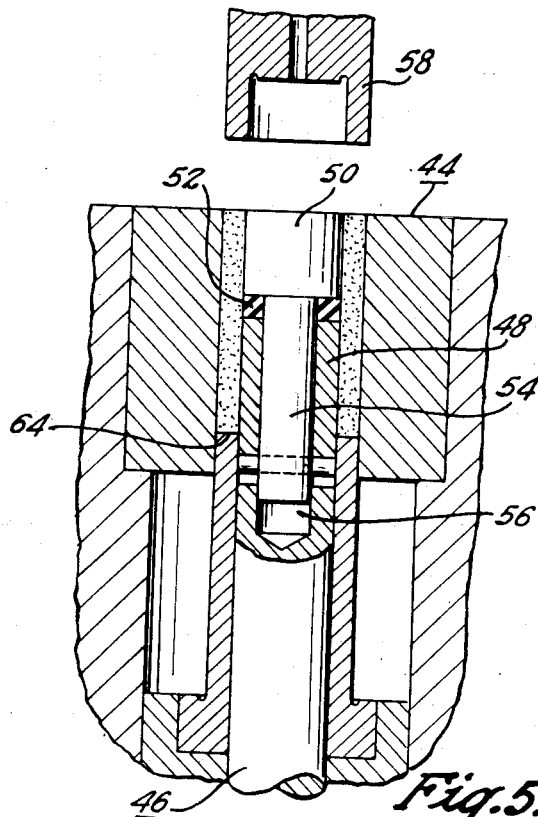
Figure 6:
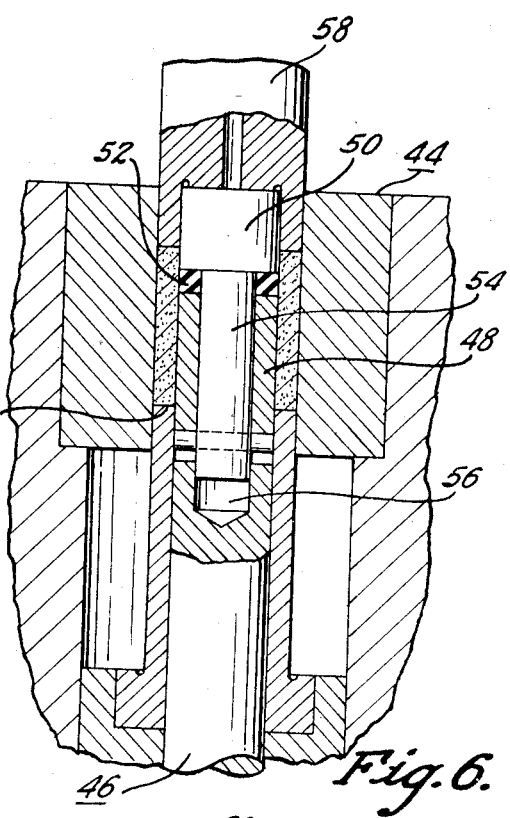
Figure 7:
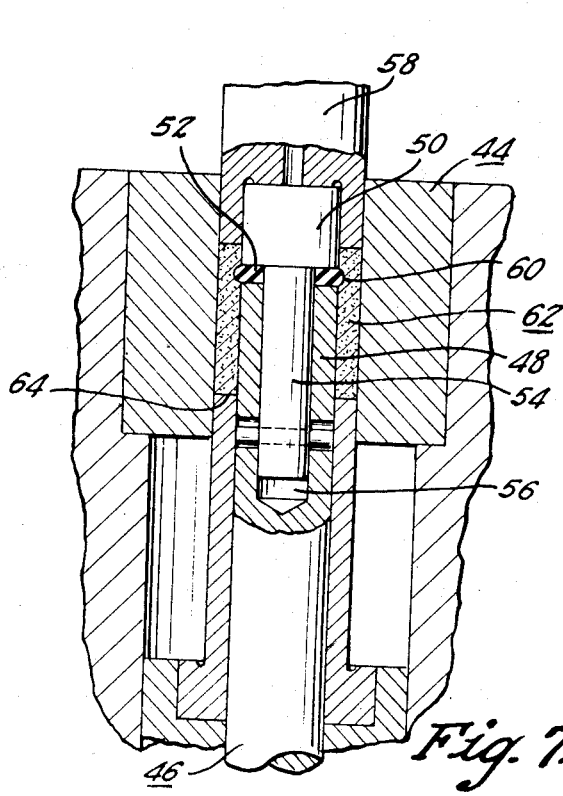

Figs. 1 through 4 show an apparatus and the steps in the method of making an annular bushing from powdered metal wherein a groove is formed around the outer periphery of a bushing surface. Referring particularly to Fig. 1, a member 20 supports a die barrel 22 which consists of an annular recess closed at the bottom thereof by means of a movable wall 24 which has a pilot rod 26 passing therethrough to form an inner bore of the bushing. The die barrel 22 consists of three portions namely upper member 28, a lower member 30, an intermediate resilient member 32. The members 30 and 28 are relatively movable due to the recessed portion as at 34 which provides for sufficient movement to compress the rubber portion 32. An upper punch member 36 is also provided which has a bore 38 therein that passes over the pilot rod 26. When the die barrel 22 is filled with metal powder 40, as shown in Fig. 1, the punch 36 descends and compresses the powder as shown in Fig. 2. The lower portion of the die 30 is then moved upwardly to further compress the powder and simultaneously to cause the rubber portion 32 to be compressed and to expand radially inwardly and thereby form a groove 41 of annular formation at the external surface of the bushing. After the pressure is relieved, the die resumes the position shown in Fig. 4 wherein the rubber portion again is of the same inner diameter as the remainder of the die barrel whereupon the lower wall 24 is pressed upwardly to eject the bushing 42.

Figure 8:
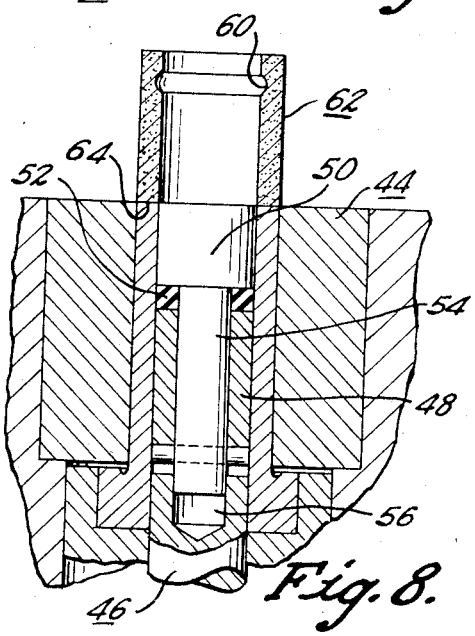
Figure 9:
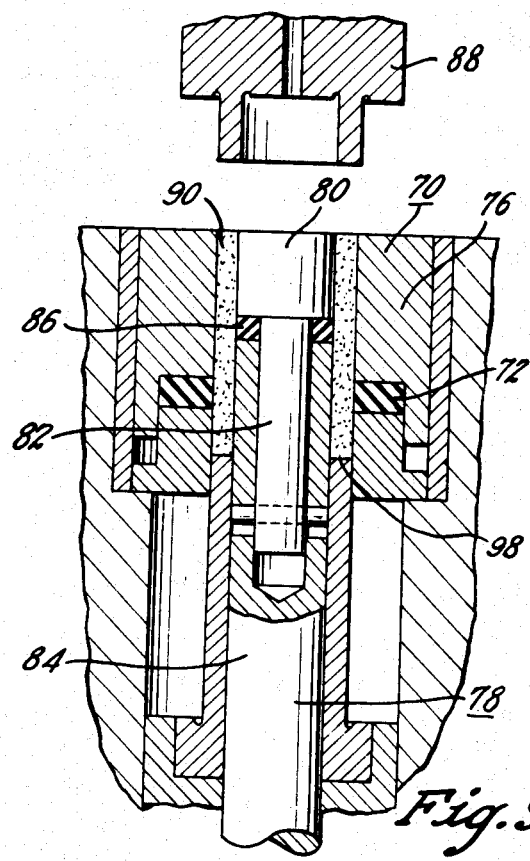

Figs. 5 through 8 show another type of apparatus wherein the groove may be formed at the inner surface of the bushing. In this instance, a die barrel 44 is provided which includes an inner pilot rod 46 that includes three portions thereon namely, a lower portion 48, an upper portion 50 and an intermediate rubber portion 52. The upper portion 50 of the pilot rod is supported on a slidable member 54 which fits in a cylinder 56 on the lower portion 48 of the pilot. After metal powder has been filled in the die barrel 44, an upper punch 58 compresses the powdered material downwardly as in Fig. 6 and then acts upon the movable upper portion 50 of the pilot 46 whereupon the rubber 52 is compressed and caused to expand radially outwardly to form a groove 60 in the inner surface of the bushing 62. It will be noted, in this particular instance that the lower die wall 64 is immovable during the entire briquetting operation but upon completion of the briquetting the lower die wall 64 moves upwardly as shown in Fig. 8 to eject the bushing 62 from the die. If desired, the lower die wall 64 may move upwardly as in connection with the previous embodiment.

Figure 10:
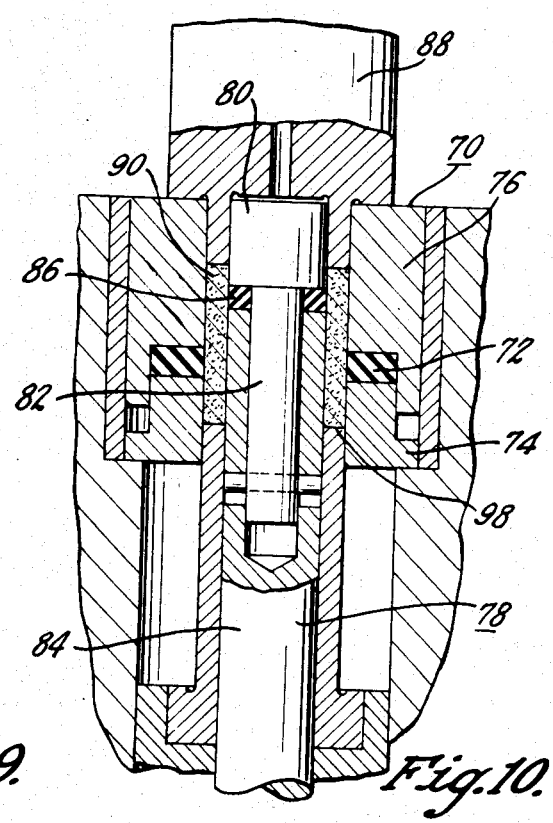
Figure 11:
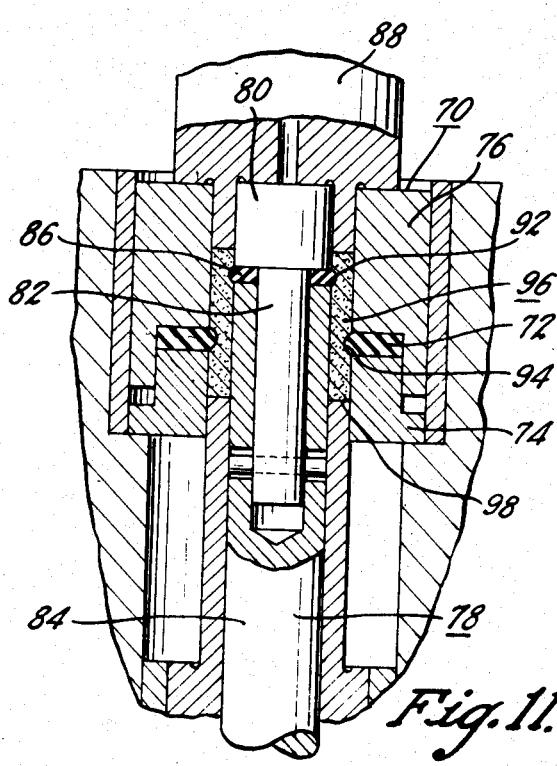
Figure 12:
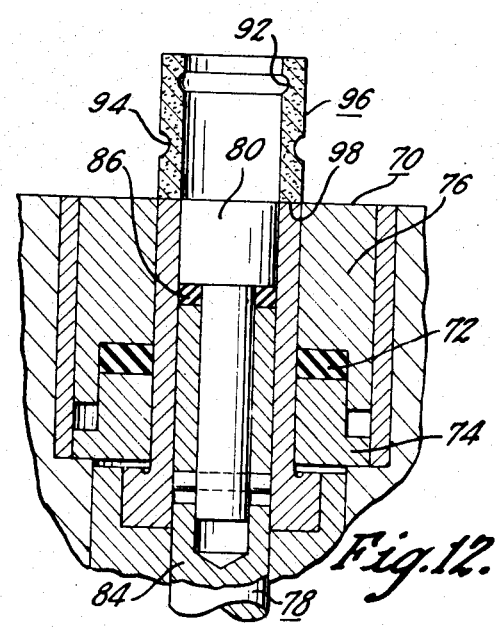

Figs. 9 through 12 show a combination of the apparatus heretofore described in that the die barrel 70 is provided with a rubber portion 72 and a lower portion 74 and a movable upper portion 76. The pilot 78, in this instance, includes a slidable upper portion 80 which is suitably carried by the member 82 which is supported in the lower member of the pilot 84. Between the members 80 and 84 of the pilot 78 is interposed a rubber portion 86. Thus, when the punch 88 descends downwardly as shown in Fig. 10, the powdered metal 90 which has been filled into the barrel, is compressed whereupon further compression by the punch causes simultaneous compression of the rubber parts 86 in the pilot and 72 in the die barrel causing each rubber part to expand for forming internal and external grooves 92 and 94 respectively in the bushing 96. After removal of the pressure, the rubber parts assume their normal diameter and the lower wall 98 of the die barrel is moved upwardly to eject the bushing as shown in Fig. 12.

From the foregoing description it is apparent that indentations may be formed either at the external or internal surfaces of articles briquetted in the usual types of briquetting machinery by the addition of rubber portions in the die and in the pilot whereby reentrant angles may be formed on the briquetted part and wherein the die portion forming said angles after release of the pressure thereon assume its normal diameter which is similar to the diameter of the portion of the die that carries the resilient die member. Thus, ejection of the part from the die is simplified and no complicated mechanism is required for operating radially moving die portions. Furthermore, since the resilient portion of the die moves during the compression of the article therein, the density of the article is substantially uniform since the groove formation is started before complete compression of the article is accomplished. This factor is of great importance and has heretofore been impossible to attain.

While the embodiments of the present invention as herein disclosed, constitute preferred forms, it is to be understood that other forms might be adopted all coming within the scope of the claims which follow.

What is claimed is as follows:

1. In a method for producing articles from powdered materials, which articles include an annular groove therearound, the steps of providing a punch, providing a cooperating die member with a cavity therein, one of said members including an annular resilient rubber-like portion having an uncompressed diameter equal to the diameter of said member, filling the cavity in the die member with powdered material, compressing the powdered material axially of the die by moving the punch member therein, compressing the material in a plane transverse to the movement of the punch by causing said rubber-like portion to bulge radially outwardly of the member and simultaneously further compressing the powdered material by continued movement of the punch for forming a briquette of the desired shape, removing the punch from the die member and substantially simultaneously causing the rubber-like portion to assume its normal diameter, and then removing the article from the die member whereby the article is self-sustaining and includes an annular groove therearound.

2. In a method for producing articles from powdered material, which articles include an annular groove around the outer periphery thereof, the steps comprising: providing a punch, providing a cooperating die member with a cavity therein wherein an annular portion of said cavity is formed from resilient rubber-like material having an uncompressed diameter equal to the diameter of the cavity, filling the cavity in the die member with powdered material, compressing the powdered material axially of the die by moving the punch member therein, compressing the material in the die in a plane transverse to the movement of said punch by causing the resilient rubber-like portion of the die to be expanded radially inwardly and thereby forming an annular groove around the outer periphery of the partially compacted powdered material, simultaneously further compressing the powdered material by continuing movement of said punch for forming a briquette of the desired shape, removing the punch from the die member and substantially simultaneously relieving the compression on said rubber-like portion for permitting the rubber-like portion to assume its normal diameter, and then removing the article from the die member.

3. In a method for producing articles from powdered material, which articles are cored and including an annular groove therein within the cored portion thereof, comprising the steps of providing a punch having one portion thereof formed from resilient rubber-like material with an uncompressed diameter equal to the diameter of the remainder of the punch, providing a cooperating die member having a cavity therein of a diameter equal to the diameter of the article desired to be formed, positioning the punch within the die and thereby forming an annular cavity between the punch and the die, filling said cavity with powdered material, providing a second punch member which is annular in cross section and will fit within the cavity between said first punch member and the die member, partially compressing the powdered material by moving said second punch member thereagainst, compressing the metal powder in an annular direction by causing the first punch member to be compressed for bulging the rubber-like portion thereof outwardly and thereby forming an annular groove at the internal surface of the partially compressed powdered material, simultaneously further compressing the powdered material by continuing movement of the second punch member for forming a briquette of the desired shape, removing said second punch member from the die and substantially simultaneously removing pressure from the first punch member for causing the rubber-like portion thereof to assume its normal diameter, and then ejecting the self sustaining briquette of powdered material from the die, whereby said briquette comprises a cored object having an annular groove positioned at the inner periphery thereof.

CHARLES R. TALMAGE.